United States Patent [19]

Caroll et al.

[11] Patent Number: 4,875,709
[45] Date of Patent: Oct. 24, 1989

[54] CONTROLLED LEAK PATH

[76] Inventors: James E. Caroll, 8356 Main St.; Steven R. Zillig, Box 348, 8828 Main St., both of Williamsville, N.Y. 14221

[21] Appl. No.: 161,193

[22] Filed: Feb. 26, 1988

[51] Int. Cl.$^4$ ............................................. F16L 55/00
[52] U.S. Cl. ..................................... 285/14; 285/319; 285/921
[58] Field of Search ................. 285/924, 14, 319, 921, 285/13

[56] References Cited

U.S. PATENT DOCUMENTS

| | | |
|---|---|---|
| 763,317 | 6/1904 | Nelson . |
| 1,933,117 | 10/1933 | Markle . |
| 2,244,939 | 6/1941 | Carlson ............................ 285/924 X |
| 2,441,344 | 5/1948 | Bosworth . |
| 2,444,888 | 7/1948 | Baumgardner . |
| 2,538,683 | 1/1951 | Guiler et al. . |
| 3,141,685 | 7/1964 | Watts . |
| 3,191,972 | 6/1965 | Collar . |
| 3,221,758 | 12/1965 | Morse . |
| 3,352,576 | 11/1967 | Thorne-Thomsen . |
| 3,439,943 | 4/1969 | Thorne-Thomsen . |
| 3,584,900 | 6/1971 | Lennon . |
| 3,650,549 | 3/1972 | Pepper . |
| 3,698,742 | 10/1972 | Jones et al. . |
| 3,711,125 | 1/1973 | Dehar . |
| 3,718,350 | 2/1973 | Klein ............................... 285/924 X |
| 3,826,523 | 7/1974 | Eschbaugh . |
| 3,837,687 | 9/1974 | Leonard . |
| 3,844,585 | 10/1974 | Sands et al. . |
| 3,847,421 | 11/1974 | Eschbaugh et al. . |
| 4,036,515 | 7/1977 | Karcher et al. . |
| 4,055,359 | 10/1977 | McWethy ....................... 285/924 X |
| 4,113,284 | 9/1978 | Blocker . |
| 4,123,090 | 10/1978 | Kotsakis et al. . |
| 4,181,329 | 1/1980 | Helm . |
| 4,240,651 | 12/1980 | Mariaulle . |
| 4,253,683 | 3/1981 | Jentsch et al. .................. 285/924 X |
| 4,326,569 | 4/1982 | Vaillancourt . |
| 4,329,857 | 5/1982 | Kittle et al. . |
| 4,395,800 | 8/1983 | Shindelaar . |
| 4,423,892 | 1/1984 | Bartholomew . |
| 4,483,371 | 11/1984 | Susin . |
| 4,511,162 | 4/1985 | Broyles . |
| 4,519,449 | 5/1985 | Hoskins et al. . |
| 4,538,679 | 9/1985 | Hoskins et al. . |
| 4,541,658 | 9/1985 | Bartholomew . |
| 4,601,497 | 7/1986 | Bartholomew ................. 285/921 X |
| 4,607,664 | 8/1986 | Carney et al. . |
| 4,653,781 | 3/1987 | Sheets et al. .................... 285/924 X |
| 4,676,269 | 6/1987 | Sarson ............................. 285/924 X |
| 4,707,000 | 11/1987 | Torgardh ........................ 285/924 X |
| 4,753,485 | 6/1988 | Case et al. ...................... 285/921 X |

FOREIGN PATENT DOCUMENTS

| | | |
|---|---|---|
| 27277 | 7/1969 | Austria . |
| 1142484 | 1/1963 | Fed. Rep. of Germany . |
| 2307154 | 8/1974 | Fed. Rep. of Germany . |
| 2368663 | 5/1978 | France . |
| WO85/02450 | 6/1985 | PCT Int'l Appl. ................. 285/924 |
| 982004 | 2/1965 | United Kingdom . |

Primary Examiner—Thomas F. Callaghan
Attorney, Agent, or Firm—Christel, Bean & Linihan

[57] ABSTRACT

A novel fluid coupling assembly in combination with a fluid line provided with a controlled leak path. The fluid coupling assembly includes a coupling body 12 having generally concentric first and second bores 36, 38, of greater and lesser diameters, respectively, there being a radial surface 40 between the bores, the first bore also being provided with a generally cylindrical groove 44. A resilient retainer is assembly with in the generally cylindrical groove, the retainer having a plurality of prongs 52 which extend inwardly towards the second bore. A bushing 15 is force fit into the first bore between the cylindrical groove 44 and the radial surface. A seal 16 is disposed within the coupling body between the bushing and the radial surface. The fluid line which is adapted to be associated with a coupling is provided with a flange which is engaged by the free ends of the resilient prongs when the fluid line is fully assembled within the fluid coupling assembly to hold the fluid line in place, the fluid line being provided with a controlled leak path 74 which permits the discharge of fluid only when the end portion is not fully assembled.

4 Claims, 1 Drawing Sheet

CONTROLLED LEAK PATH

CROSS REFERENCE TO RELATED APPLICATIONS

The present invention relates to an improvement in fluid couplings of the type shown in U.S. patent application Ser. No. 904,142 filed Sept. 8, 1986 which in turn shows an improvement in fluid couplings of the type shown in U.S. application Ser. No. 777,031 filed Sept. 17, 1985.

FIELD OF THE INVENTION

The present invention relates generally to the quick connect fluid coupling art, and more particularly to the combination of a fluid line and a quick connect fluid coupling assembly, characterized by the end portion of the fluid line, which is to be coupled to the fluid coupling assembly, being provided with a controlled leak path whereby when the end portion of the fluid line is not fully assembled within the fluid coupling assembly there will be controlled leakage, and when the fluid line is fully assembled within the fluid coupling assembly there will be no leakage.

BACKGROUND OF THE INVENTION

Quick connect fluid coupling assemblies are well known in the art. The present invention relates to an improvement of copending U.S. patent application No. 904,142, which application discloses a fluid coupling assembly adapted to receive the terminal end portion of a fluid line. The coupling assembly illustrated in the co-pending patent application includes a seal, a coupling body and a resilient retainer. The coupling body has generally concentric first and second bores of greater and lesser diameters, respectively, the first bore also being provided with a generally cylindrical groove which receives the resilient retainer. The retainer has a plurality of prongs which extend inwardly and towards the second bore, the prongs terminating in free ends. The seal is disposed within the coupling body between the retainer and the second bore, the seal including a rubberlike O-ring. The fluid line is adapted to be associated with the fluid coupling assembly, the terminal end portion of the fluid line being provided with a flange which is engaged by the free ends of the resilient prongs of the resilient retainer to hold the fluid line within the fluid coupling assembly when the parts are fully assembled, the seal engaging the exterior surface of the terminal end portion of the fluid line to form a fluid tight seal.

The foregoing design has been found to perform in an exemplary manner when fully assembled and is readily assembled merely by pushing the end portion of fluid line within the coupling body until the free ends of the prongs engage the flange. However, it has been determined that it is possible to insert the end portion of the fluid line within the coupling body in such a manner that the flange of the end portion of the fluid line is not engaged by the free ends of the prongs. When not fully assembled, it is still possible to achieve a good fluid tight seal. However, when not fully assembled it is possible to inadvertently disassemble the fluid line from the fluid coupling assembly.

OBJECTS AND SUMMARY OF THE INVENTION

It is an object of the present invention to provide means to identify when the terminal end portion of a fluid line is not fully assembled within a fluid coupling assembly.

More specifically, it is an object of the present invention to provide the end portion of a fluid line with a controlled leak path which will provide an indication when the end portion of the fluid line is not fully assembled within a coupling body, thus permitting fluid to leak between the seal and the end portion of the fluid line, but which will prevent leakage when the end portion of the fluid line is fully assembled with the fluid coupling assembly.

It is a further object of the present invention to provide a coupling assembly including a coupling body, a seal and a resilient retainer, wherein a bushing is disposed between the seal and the resilient retainer, the bushing both protecting the seal and preventing the seal from shifting towards the resilient retainer when a fluid line having a controlled leak path is partially assembled within the coupling assembly thereby maintaining a controlled leak path.

The foregoing objects are obtained by providing the end portion of the fluid line with a groove or the like on its external surface between the terminal end of the fluid line and an outwardly extending flange, which groove provides a leak path for fluids between the end portion of the fluid line and the seal when the end portion is only partially assembled within the fluid coupling assembly, the length of the leak path being such that fluid will not leak past the seal when the end portion of the fluid line is fully assembled within the fluid coupling assembly.

The foregoing objects of this invention will be more fully understood after a consideration of the following detailed description taken in conjunction with the accompanying drawings in which a preferred embodiment of this invention is illustrated.

DETAILED DESCRIPTION

Figure 1:
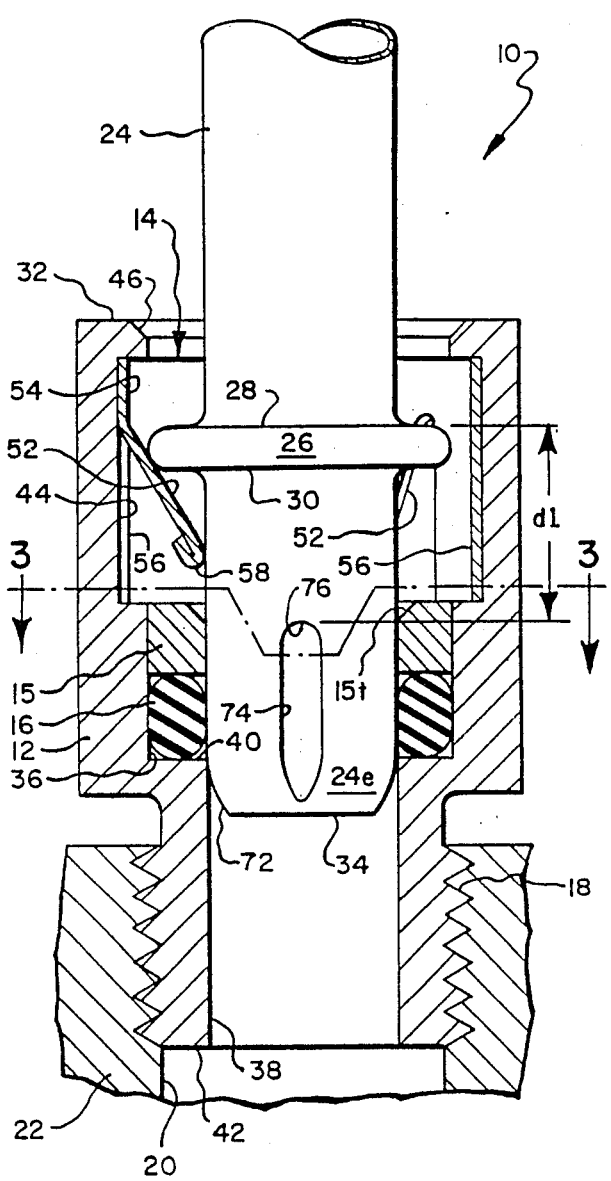
FIG. 1 is a sectional view through a fluid coupling assembly wherein the end portion of a fluid line is only partially assembled within a fluid coupling assembly.
Figure 2:
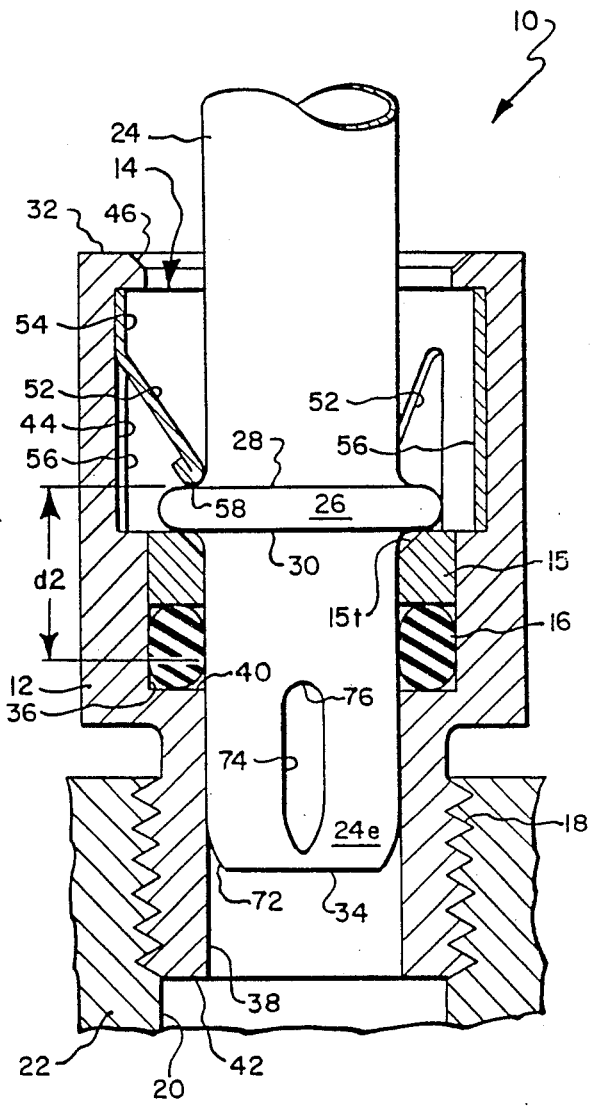
FIG. 2 is a view similar to FIG. 1, but showing the end portion of the fluid line fully inserted within the fluid coupling assembly.

Referring now to the drawings, the fluid coupling assembly is indicated generally at 10 and includes four major components, these being a coupling body 12, a resilient retainer indicated generally at 14, a bushing 15 and a seal which may be in the form of an O-ring 16. The coupling body 12, as shown in FIGS. 1 and 2, is an integral structure which may be machined from hex stock and provided with threads 18 at one end which may be screwed into a threaded port 20 of a housing 22 or the like. While the coupling body 12 is shown as a separate fitting which may be screwed into a tapped hole in the housing, various novel features of the coupling body could be formed directly in a housing or the like. In addition, the coupling body may also be provided with other suitable components, such as a ball check valve, restrictors, etc. In any event, the coupling body 12 is adapted to receive the end portion 24e of a fluid line 24 in fluid tight relationship when the end portion is fully assembled within the fluid coupling assembly. The end portion of the fluid line is preferably formed of a relatively rigid material such as copper or aluminum tubing and is provided with an annular flange 26 which can be either a separate structure telescoped over the end portion of the tube 24 and rigidly secured thereto, or can merely be an upset portion of the tube. The flange has axially spaced apart first and second surfaces 28, 30, respectively, the first surface being disposed closer to the outer surface 32 of the coupling body when assembled, and the second surface 30 being closer to the terminal end 34 of the fluid line.

The coupling body is provided with first and second coaxial bores 36, 38, respectively, which extend through the length of the coupling body. Disposed between the two bores is a radially inwardly extending surface 40. Thus, the first bore extends from the outer surface 32 to the surface 40 and the second bore 38 extends from the surface 40 to the inner surface 42. The first bore is provided with a generally cylindrical groove or undercut 44 disposed away from and between the surfaces 32 and 40. In addition, the first bore may be provided with a tapered surface 46 adjacent the outer surface 32. The design of the coupling body 12 is such that it can be readily manufactured on an automatic screw machine. It can also be an injection molded plastic part of suitable material.

Figure 4:
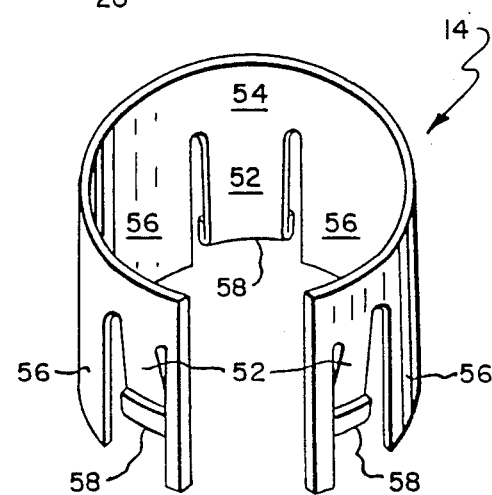
FIG. 4 is a perspective view of the retainer shown in FIGS. 1 and 2.

The retainer 14 is best shown in its free state in FIG. 4 and is made of a suitably resilient integral piece of material such as 1050/1074 steel which is hardened and plated after forming. It could also be made of a stainless steel such as 17-7. In any event, after forming, it has a radius just slightly greater than that of the cylindrical groove 44. However, since the retainer is of a C shape, it can be radially compressed and axially inserted into the coupler body 12 until the retainer snaps into place within the cylindrical groove 44. The retainer is provided with three prongs 52 which are spaced 120° apart and extend radially inwardly and away from the outer surface of the coupling body when assembled within the coupler body. Disposed above the prongs 52 is a C-shaped portion 54. Skirt portions 56 are disposed between the prongs, the upper end of the skirt portions, as viewed in FIG. 4, being integrally connected to the C-shaped portion 54. The retainer can be produced on a 4-slide machine. When the terminal end portion of the fluid line 24 is fully assembled into the coupling body 12 as shown in FIG. 2 the free ends 58 of the prongs will be disposed closely adjacent to, or in contact with, the first surface 28 of the flange 26, thereby maintaining the terminal end portion of the fluid line within the fluid coupling assembly.

The disclosed O-ring seal is made from an integral piece of rubber-like material suitable for forming O-rings. Such suitable materials are Viton, Dupont's brand of fluorocarbon, neoprene, silicon rubber, etc. The seal could be made in accordance with the disclosure of U.S. patent application No. 904,142, the subject matter of which is incorporated herein by reference thereto. Thus, the seal may include three components, these being an O-ring, a collar disposed to one side of the O-ring, and a tearable diaphragm which would extend across the collar and be capable of blocking the passage of fluid through the O-ring before it is torn. If a seal of the type having a tearable diaphragm is utilized, it is desirable that the second bore 38 be provided with a relief or enlarged diameter portion adjacent the surface 40. In addition, it should be noted that other forms of seals may be utilized.

The bushing 15 is a ring-like member formed of brass, steel, or other suitable materials. Before assembly the bushing has an outer diameter just slightly greater than the inner diameter of the first coaxial bore 36. During assembly the bushing 15 is press fit to its desired location to protect the seal and prevent the seal from undue axial shifting movement. The bushing has an inner diameter just slightly greater than the outer diameter of the end portion 24e of the fluid line 24. The bushing may be provided with a tapered surface 15t which is disposed on that side of the bushing which is initially engaged by the end portion 24e during assembly. While the bushing is illustrated and described as a separate part, it may be integral with the body 12.

The parts are initially assembled by placing the seal 16 in the first bore 36 adjacent the surface 40. The bushing 15 is now press fit into the first bore 36 until it is in its desired position as shown in the drawings. Next, the retainer 14 is radially compressed, inserted into the first bore and allowed to snap into secured relationship within the cylindrical groove 44. To this end, the combined length of the first portion 54 and the skirt portions 56 are equal to the axial length of the cylindrical groove 44 so that the retainer will not shift axially once assembled. If the coupling body 12 is to be secured to a threaded port 20 in a housing 22 or the like, it is then simply screwed into place. Next, it is only necessary to force the end of the fluid line into the coupling. The terminal end portion of the fluid line is preferably provided with rounded end portion 72 to facilitate its entry into the bushing 15 and the O-ring. If the O-ring is provided with a diaphragm, as the fluid line is inserted into the coupling, the terminal end 34 will first initially contact the diaphragm, then stretch the diaphragm, and finally tear the diaphragm. The torn diaphragm will be preferably received within a relief within bore 38.

Figure 3:
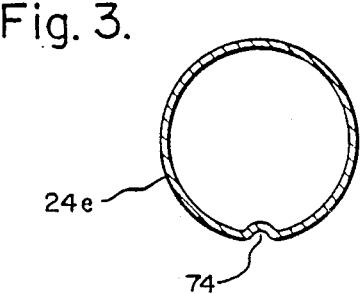
FIG. 3 is a section through the fluid line taken generally along the line 3—3 in FIG. 1.

In accordance with the principles of the present invention, the fluid line is provided with an exterior groove 74 which provides a controlled leak path. The groove can be formed in the end portion of the fluid line by deforming the fluid line in the manner indicated in FIG. 3. Alternatively, the groove 74 can be formed by removing material from the outer surface of the fluid line if the fluid line is of sufficient wall thickness. In any event, the controlled leak path must extend from the rounded end portion 72 of the end portion 24e to a location spaced between the end 34 and the flange 26. The length of the controlled leak path 74 is critical as it must be long enough to permit fluid to flow between the end portion of the tube and the seal when the end portion is only partially assembled as indicated in FIG. 1, but which will prohibit the flow of fluid when the end portion of the fluid line is fully assembled as indicated in FIG. 2. To this end, the end 76 of the controlled leak path which is spaced closest to flange 26 must be spaced away from the surface 28 a distance d1 (FIG. 1) which is at least equal to but preferably slightly in excess of the distance d2 (FIG. 2) between the free end 58 of the prongs 52 and the end of that portion of the O-ring which is compressed about the end portion 24e of the fluid line 24.

With further regard to the dimensions of the leak path, it is desirable that the seal should not contact the leak path 74 when the parts are in their fully assembled position shown in FIG. 2. However, when the parts are in the partially assembled position shown in FIG. 1 the leak path will extend entirely through the seal. When the fluid line is assembled within the coupling assembly to a position between the positions shown in FIG. 1 and FIG. 2, the fluid line is in an unstable position and in many situations the prongs 52 which bear against the flange 26 will cause the fluid line 24 to assume the position shown in FIG. 1. In those few situations where the fluid line does not spring back to the position shown in FIG. 1 due to the force exerted upon the flange 26 by the prongs 52, the fluid line will consistently be shifted to the FIG. 1 position during leak testing.

When the fluid line has been fully inserted into the fluid coupling assembly 10, the prongs 52 will prevent the withdrawal of the fluid line from the coupling and the O-ring 16 will be suitably axially compressed between the surface of the fluid line 24 and the surface of the first bore 36 to provide a fluid tight seal. In addition, if the O-ring is provided with a diaphragm, the torn diaphragm will also act as a lip seal about the fluid line. It should be noted that the diameter of the fluid line which is received within the second bore 38 is also just slightly less than the diameter of the second bore and the bushing 15. Thus, once the fluid line is fully assembled within the coupling, it is supported by the bushing and the second bore. However, when it is not fully assembled as shown in FIG. 1 it may have the appearance of being fully assembled and thus it is necessary to provide the controlled leak path 74 so that the installer can see by the leakage of fluid during leak testing that the parts have not been fully assembled.

While a preferred embodiment has been disclosed above, it is to be understood that this invention is not to be limited to the above embodiment as various alternative embodiments will occur to those having ordinary skill in the arts.

What is claimed is:

1. A fluid coupling assembly including a body provided with a first bore extending inwardly from one side of the body, an annular seal disposed within the bore, and a resilient retainer disposed between said one side of the body and the seal, the retainer including a plurality of prongs extending radially inwardly and towards the seal; the coupling further including a fluid line having a rigid tubular end portion with a radially outwardly extending flange disposed away from a terminal end of the end portion, characterized in that the coupling further comprises a controlled leak path disposed on the tubular end portion of the fluid line between the terminal end and the flange, the controlled leak path being so dimensioned that fluid may leak between the end portion and the seal when the end portion is not fully assembled within the body, but fluid will not leak between the end portion and the seal when the end portion is fully assembled within the body with the prongs engaging the flange to prevent the withdrawal of the end portion.

2. The combination as set forth in claim 1 wherein the controlled leak path is a groove formed on the exterior surface of the end portion of the fluid line.

3. The combination as set forth in claim 1 and wherein a second bore extends inwardly from the first bore and is of a smaller diameter than the first bore to provide a radially inwardly extending surface between the bores, and further characterized by the provision of a bushing force fit into the first bore between the resilient retainer and the radially inwardly extending surface, the seal being disposed between the bushing and the radially inwardly extending surface.

4. A fluid coupling assembly including a body provided with a first bore extending inwardly from one side of the body, an annular seal disposed within the bore, and a resilient retainer disposed between said one side of the body and the seal, the retainer including a plurality of prongs extending radially inwardly and towards the seal; the coupling further including a fluid line having a rigid tubular end portion with a radially outwardly extending flange disposed away from a terminal end of the end portion, the tubular end portion having an external surface, and the flange having axially spaced apart first and second surfaces, the first surface being engaged by the prongs when the tubular end portion is fully assembled within the body, characterized in that the coupling further comprises a controlled leak path in the form of a groove disposed on the external surface of the tubular end portion of the fluid line between the terminal end and the flange, the controlled leak path extending along the outer surface of the end portion of the fluid line from the terminal end to a location spaced away from the first surface of the flange a distance equal to or slightly greater than the distance between the prongs and that portion of the annular seal which is compressed about the end portion of the fluid line.

* * * * *